United States Patent
Sanderson

(10) Patent No.: US 9,409,328 B2
(45) Date of Patent: Aug. 9, 2016

(54) MICROWAVE CURING OF COMPOSITE MATERIAL

(71) Applicant: AIRBUS OPERATIONS LIMITED, Bristol (GB)

(72) Inventor: Timothy Sanderson, Bristol (GB)

(73) Assignee: Airbus Operations Limited, Bristol (GB)

( * ) Notice: Subject to any disclaimer, the term of this patent is extended or adjusted under 35 U.S.C. 154(b) by 385 days.

(21) Appl. No.: 13/859,991

(22) Filed: Apr. 10, 2013

(65) Prior Publication Data

US 2013/0285292 A1 Oct. 31, 2013

(30) Foreign Application Priority Data

Apr. 25, 2012 (GB) .................................. 1207230.2

(51) Int. Cl.
*B29C 43/52* (2006.01)
*B29C 35/08* (2006.01)
*H05B 6/64* (2006.01)

(52) U.S. Cl.
CPC ............. *B29C 43/52* (2013.01); *B29C 35/0805* (2013.01); *H05B 6/6491* (2013.01); *B29C 2035/0855* (2013.01)

(58) Field of Classification Search
CPC ................... B29C 2035/0855; B29C 65/1425; B29C 70/34; B29C 70/345; B29C 70/40; B29C 70/42; B29C 70/46
USPC ......................................... 264/257, 258, 402
See application file for complete search history.

(56) References Cited

U.S. PATENT DOCUMENTS

| 2004/0222554 A1* | 11/2004 | Akopyan .................... 264/227 |
| 2010/0289188 A1 | 11/2010 | Graeber et al. |
| 2011/0031433 A1* | 2/2011 | Burchell ............... B29C 70/025 252/62.56 |
| 2011/0163480 A1 | 7/2011 | Herkner |

FOREIGN PATENT DOCUMENTS

| DE | 10 2009 052 835 | 5/2011 |
| JP | 2-6107 | 1/1990 |

OTHER PUBLICATIONS

Search Report for GB 1207230.2 mailed Aug. 10, 2012.
Jeff Sloan, "Composites—Microwave: An Alternative to the Autoclave?", www.compositesworld.com/articles/microwave-an-alternative-to-the-autoclave, May 2011.

* cited by examiner

*Primary Examiner* — Christina Johnson
*Assistant Examiner* — Xue Liu
(74) *Attorney, Agent, or Firm* — Nixon & Vanderhye P.C.

(57) ABSTRACT

A method of curing a composite material. A tool is heated using microwaves. At least a part of the composite material is shielded by reflecting microwaves away from the composite material with a shield. Heat is transferred from the tool through the shield to the composite material. The tool comprises a material which is sensitive to microwaves so that, when microwaves are incident upon the tool, some of the microwaves are absorbed by the microwave-sensitive material, thereby heating the tool.

13 Claims, 3 Drawing Sheets

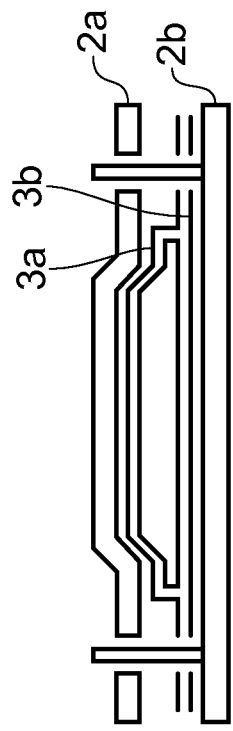
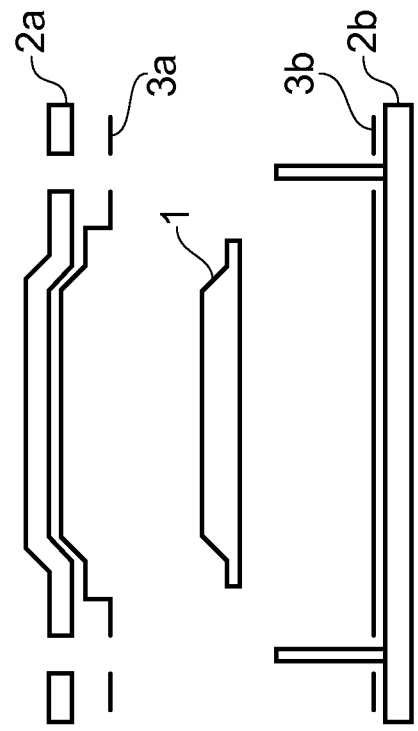
FIG. 2a
FIG. 2b
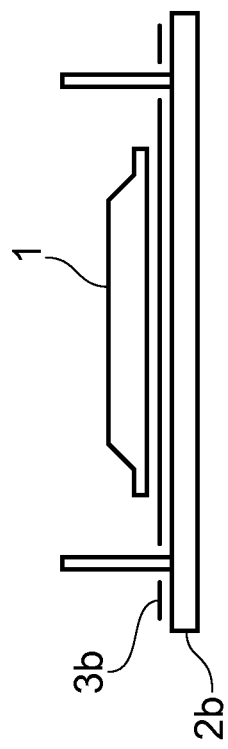
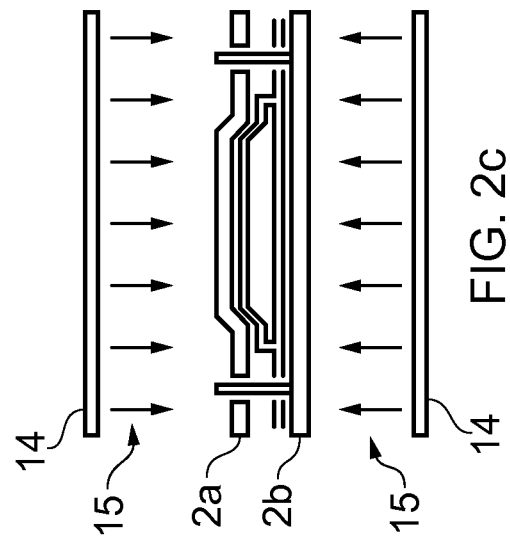
FIG. 2c
FIG. 2d

MICROWAVE CURING OF COMPOSITE MATERIAL

This application claims priority to GB 1207230.2 filed 25 Apr. 2012, the entire contents which is hereby incorporated by reference.

FIELD OF THE INVENTION

The present invention relates to a method of curing a composite material, and to apparatus for curing a composite material.

BACKGROUND OF THE INVENTION

Aerospace manufacturers increasingly use composite materials to reduce the weight and increase the performance of some components, thereby reducing the weight and improving the efficiency of aircraft.

Composite materials used by the aerospace industry typically comprise a fibrous material in a polymer matrix. A composite component comprising a fibrous material in a matrix material may be produced by arranging one or more ply layers of fibrous material on a mould tool and curing the component to form a consolidated component. Typically, the fibrous material is provided in the form of one or more "pre-preg" layers. Alternatively one or more "dry" ply layers may be arranged on a mould tool and a matrix material may be applied to the ply layers. Typically the component is cooked or "cured" at elevated temperature and pressure in an autoclave. Alternatively, some matrix materials may not require the increased pressure provided by an autoclave so that the component may be cured at elevated temperature in an oven.

Curing a composite component in an autoclave or oven is a time consuming process, typically lasting for approximately four hours. The cycle time is limited by the time taken for the autoclave or oven, the component and the tooling to reach the desired curing temperature. The curing process also uses a large amount of energy because the autoclave or oven itself is heated as well as the component.

Microwaves may be used to cure a composite component in order to reduce the time of the curing process. One known method of microwave curing is described in US2010/0163480. A microwave-sensitive material in contact with a composite part is heated by microwaves. The composite part is heated partly by absorbing microwaves, and partly by being in contact with the heated microwave-sensitive material. Another known method of microwave curing is described in JP2006107 (A). A composite panel is fixed into a frame. The composite panel and the frame are formed from the same material. The frame is heated by microwaves and this heat is transmitted to the panel.

However, a problem with known microwave curing methods, including those described in US2010/016348 and JP2006107 (A), is that non-uniform absorption of microwaves by the composite component may lead to a non-uniform temperature distribution through the component as it cures, with "hot spots" and "cold spots" present. These "hot spots" and "cold spots" may be difficult to predict, monitor and control, and may result in reduced and unpredictable performance of the component.

It is, therefore, desirable to provide a method for curing a composite component using microwaves which reduces or controls the unpredictable nature of the temperature distribution in the component.

SUMMARY OF THE INVENTION

A first aspect of the invention provides a method of curing a composite material, the method comprising: heating a tool using microwaves; shielding the composite material by reflecting microwaves away from the composite material with a shield; and transferring heat from the tool through the shield to the composite material.

A second aspect of the invention provides apparatus for curing a composite material, the apparatus comprising: a microwave emitter; a microwave-reflective shield; and a microwave-sensitive tool between the emitter and the shield.

The tool typically comprises a material such as a ceramic or polyester which is sensitive to microwaves so that, when microwaves are incident upon the tool, some of the microwaves are absorbed by the microwave-sensitive material, thereby heating the tool.

The shield may be positioned on one side of the composite material only, between the composite material and the microwave emitter. Alternatively a pair of shields may be provided on opposite sides of the composite material, each positioned between the composite material and a respective microwave emitter. Optionally the shield(s) may substantially surround the composite material, thus providing a shielding effect across the entire surface area of the composite material so that substantially no microwaves are incident upon the composite material while the tool is being heated. Alternatively the shield may only cover a part of the composite material so that part of the composite material is shielded and part is unshielded.

The shield is typically disposed between the tool and the composite material so that heat passes through the shield as it is transferred from the tool to the composite material.

A breather layer may be provided, for example a thin polyester foam layer. The breather layer is typically positioned between the composite material and the tool. The breather layer may provide a passage for air to flow around the component and may absorb excess matrix material from the component. The breather layer may substantially surround the component or may extend over only part of the component.

The breather layer is preferably positioned between the shield and the tool. Alternatively it may be positioned between the shield and the composite material, in which case a peel ply may be required between the breather layer and the composite material to ensure the breather layer does not stick to the composite material.

The shield is preferably conductively coupled with the tool so that it can receive heat from the tool by conduction. That is, the shield may contact the tool directly, or it may contact one or more layers (such as a breather layer) which in turn contacts the tool so it can conduct heat from the tool to the shield. Similarly the shield is preferably conductively coupled with the composite material so that it can transmit heat to the composite material by conduction. That is, the shield may contact the composite material directly, or it may contact one or more layers which in turn contacts the composite material so it can conduct heat from the shield to the composite material.

Typically the tool comprises a moulding surface, and the method further comprises applying moulding pressure to the composite material with the mould surface through the shield to mould or shape the composite material while the tool is heated.

The tool may apply a pressure of at least 0.1 MPa (1 bar) to the composite material through the shield. In an autoclave the pressure applied by the tool may be greater than 0.6 MPa (6 bar), typically in the range of 0.6-1.5 MPa (6-15 bar).

Preferably the composite material is raised to a temperature of at least 100° C., typically at least 120° C. Preferably the temperature of the composite material is raised no higher than 200° C. during the curing process.

Preferably the temperature of the composite material is raised to a desired curing temperature, and then kept at that temperature (+/−5° C.) as it cures.

The shield may comprise a sheet, which may be flexible. The sheet may be, for example, polyester mesh fabric coated with copper and nickel, or a sheet of any other material capable of reflecting microwaves.

The shield may be provided as a separate part from the tool, or it may be integrated into the tool for instance by being bonded to the tool or provided as a sub-layer within the tool.

The apparatus may comprise a pair of microwave-sensitive tools with opposed moulding surfaces; and a pair of microwave-reflective shields between the opposed moulding surfaces; wherein one or both of the tools can be moved with respect to the other tool to compress the composite material between the moulding surfaces. Typically the tools are mounted to each other by a spigot arrangement.

The (or each) tool may comprise at least one temperature sensor.

The (or each) tool may comprise a port for connection to a vacuum generator. Where a breather layer is provided, then it typically covers the port in the tool, thereby preventing liquid matrix material from being drawn into the hole by the vacuum.

The composite material typically comprises a reinforcement phase (fibrous or particulate) in a matrix material. The composite material may, for example, be a polymer matrix reinforced with fibres such as carbon fibres, glass fibres or aramid fibres.

The wavelength of the microwaves is typically above 500 MHz and most typically above 900 MHz.

The wavelength of the microwaves is typically below 30 GHz and most typically below 25 GHz.

In a preferred embodiment the wavelength of the microwaves is between 1 GHz and 5 GHz.

BRIEF DESCRIPTION OF THE DRAWINGS

Embodiments of the invention will now be described with reference to the accompanying drawings, in which:

FIGS. 2a-2d illustrate the steps of the method by which the apparatus of FIG. 1 is used to cure the composite component.

DETAILED DESCRIPTION OF EMBODIMENT(S)

Figure 1:
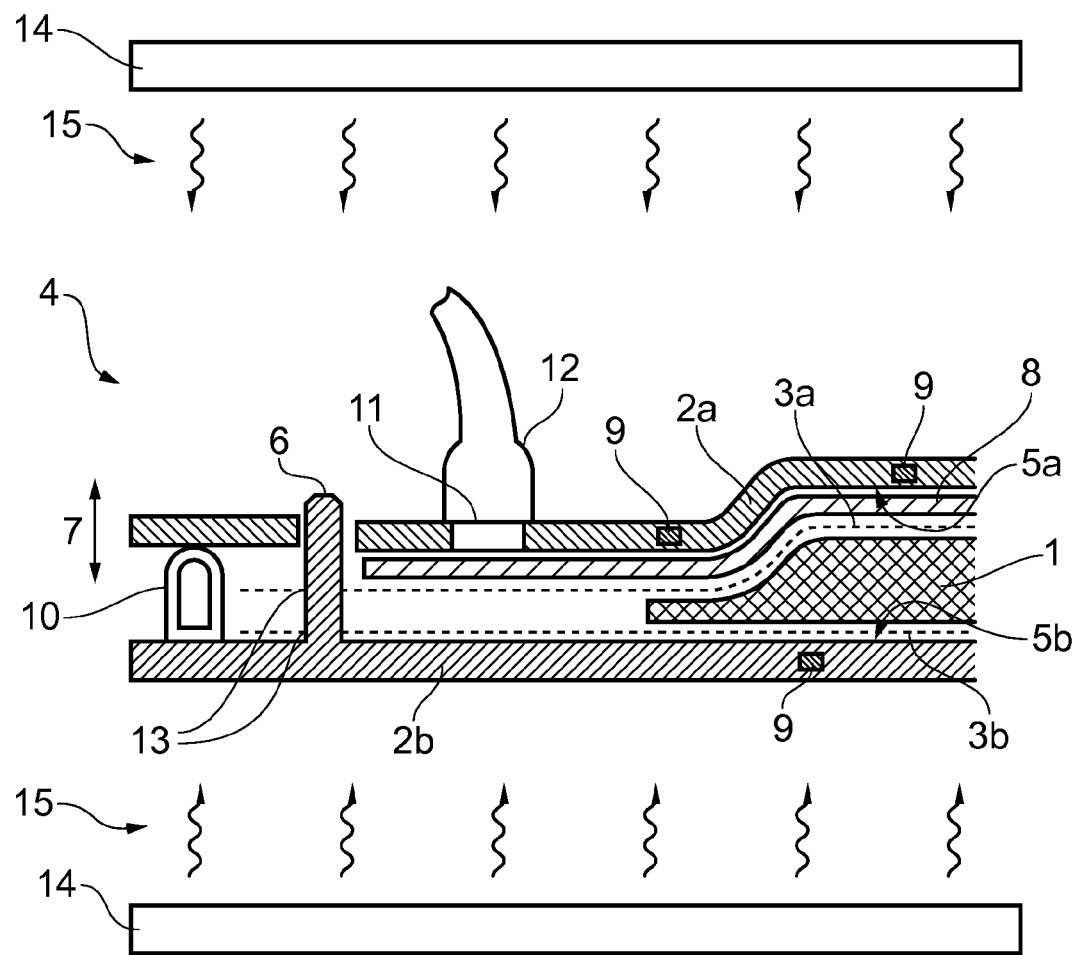
FIG. 1 is a cross section view through apparatus used to cure a composite component in one embodiment of the invention.

FIG. 1 is a cross section through apparatus 4 for curing an un-cured or partially cured composite component 1. The apparatus comprises a pair of tools 2a, 2b on opposite sides of the component 1 and a pair of shields 3a, 3b on opposite sides of the component 1, each shield being disposed between the component 1 and a respective one of the tools. A pair of microwave emitting devices 14 are also provided on opposite sides of the component.

The component 1 comprises a plurality of "pre-preg" plies of composite material, each ply comprising a layer of woven or unidirectional carbon fibres impregnated with a polymer resin matrix material in an un-cured or partially cured state.

The plies are laid up either by hand or using AFP or ATL manufacturing methods (or by any other known method) in the desired positions and orientations for the finished component, but remain (at least partially) unconsolidated prior to a curing process described below.

The upper and lower tools 2a, 2b have moulding surfaces 5a, 5b respectively for applying moulding pressure to the component 1 so as to impart the desired shape to the component. The upper tool 2a is mounted to the lower tool 2b via a plurality of spigots 6 which are rigidly mounted to the lower tool 2b, thereby enabling the upper part to translate away from or towards the lower tool 2b, as indicated by the double-headed arrow 7. The tools 2a, 2b may further comprise additional retaining means (not shown) for holding the upper tool 2a in position relative to the lower tool 2b.

The tools 2a, 2b are formed from a ceramic material which is sensitive to microwaves, that is to say, a material which absorbs at least some frequencies of microwaves and is heated by the absorption of microwaves. For example the ceramic material may comprise a mixture of magnetite and petalite. The ceramic material may be mixed with a conductive filler to ensure heat is conducted easily through the tool. Possible conductive fillers include ferrite, carbon, polyesters, aluminium and metal salts.

Several thermocouples 9 are embedded within the tools 2a, 2b at various locations. The thermocouples 9 measure the temperature at their respective locations across the tools 2a, 2b. The sensed temperature data from the thermocouples 9 is transmitted to a processing system (not shown) which controls the operation of the microwave oven.

The lower tool 2b comprises a flexible seal member 10 extending around the outside edge of its upper surface. The seal member 10 engages the lower surface of the upper tool 2a when the upper tool is mounted on the lower tool 2b, thereby forming a sealed vacuum chamber between the upper and lower tools with a boundary defined by the seal member. The seal member 10 is flexible in the direction of movement 7 of the upper tool 2a so that, when the upper tool moves relative to the lower tool 2b, the seal member deforms to accommodate the change of position while maintaining a seal between the upper and lower tools.

The upper tool 2a comprises a hole 11 extending through its thickness from the moulding surface 5a to a vacuum duct 12 which is attached to the upper tool. The vacuum duct 12 is connected to a vacuum pump (not shown). The pump is operable to draw air out from the sealed vacuum chamber between the tools through the hole 11 to create a partial vacuum between the tools 2a, 2b.

A thin polyester foam breather layer 8 is provided between the upper shield 3a and the upper tool 2a to assist with the evacuation of air from the sealed vacuum chamber between the tools. The breather layer 8 provides a passage for air to flow around the component and out of the vacuum chamber when the vacuum pump is operated to create a partial vacuum. The breather layer 8 also acts to absorb excess liquid matrix material from the component 1, and covers the hole 11 thereby preventing liquid matrix material from being drawn into the hole by the vacuum. The breather layer 8 has a low thermal mass compared to the thermal mass of the component 1 and the tools 2a, 2b and does not, therefore, significantly increase the time taken to bring the component 1 to a desired temperature.

The shields 3a, 3b each comprise a flexible sheet of copper and nickel coated polyester mesh fabric, available from www.lessemf.com. The shields 3a, 3b are reflective to at least some frequencies of microwaves.

The shields 3a, 3b fit between the tools 2a, 2b and conform to the moulding surfaces 5a,b. The shields 3a, 3b have holes 13 for receiving the spigots 6, which act to hold the shields in the desired positions.

The microwave emitting devices 14 emit microwaves at a frequency of about 2.5 GHz. The operation of the microwave emitting devices 14 is controlled by the processing system (not shown).

The apparatus is operated as indicated in FIGS. 2a-2d. In FIG. 2a the lower shield 3b is arranged on the lower tool 2b and the un-cured or partially cured composite material of the component 1 is arranged on the lower tool with the lower shield between the lower tool and the component. The upper shield 3a is then arranged on the component 1 and the upper tool 2a is mounted on the spigots 6 with the breather layer 8 (not shown in FIGS. 2a-2d) arranged between the upper shield and the upper tool, so that the component is sandwiched between the upper and lower tools, as indicated in FIG. 2b.

Figure 3:
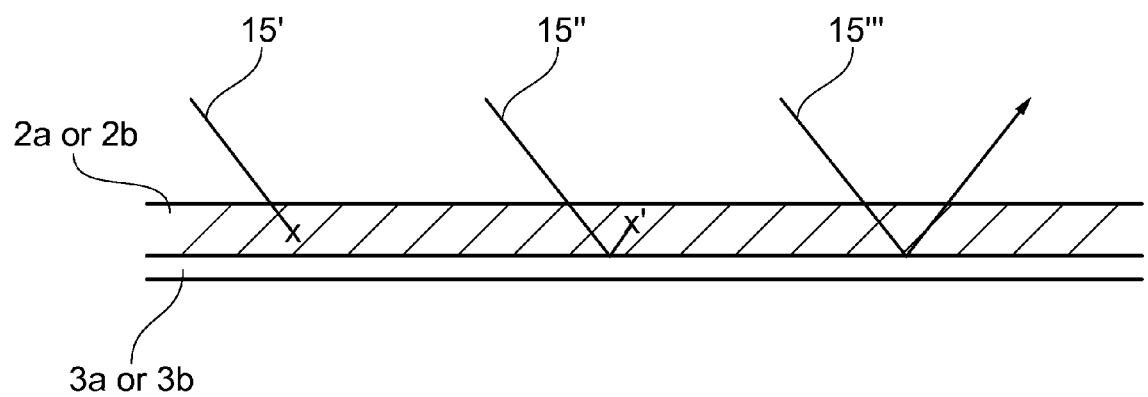
FIG. 3 is a cross section view through the apparatus of FIGS. 1 and 2 showing the paths of microwaves passing into the tool.

The tools 2a, 2b (with the component 1 arranged in between) are then placed in the microwave oven and the microwave emitting devices 14 are used to generate microwaves 15 which are directed towards the tools to heat the tools, as indicated in FIG. 2c. As shown in FIG. 3, some of the microwave energy (15', 15", 15''') incident upon the tools 2a, 2b passes into the tools. A portion (15') of the microwave energy is absorbed before reaching the shield 3a, 3b, thereby heating the tool. A portion (15",15''') of the microwave energy passes through the tool and is reflected back by the shield 3a, 3b. A portion (15''') of the reflected microwave energy passes back through the tool into the oven. A portion (15") of the reflected microwave energy is absorbed by the tool, thereby heating the tool. The shield therefore increases the efficiency of the heating of the tools 2a, 2b as well as providing a shielding effect for the component 1 preventing hot spots from forming.

The tools 2a, 2b act as hot plates and transfer heat to the component 1 through the shields 3a, 3b during a curing process, so that the component is only indirectly heated by the microwaves. The lower shield 3b contacts the component 1 and the lower tool 2b. The upper shield 3a contacts the component 1 and the breather layer 8, which in turn contacts the upper tool 2a. The shields 3a, 3b therefore transfer heat from the tool to the component by conduction.

The component 1 is heated to a temperature of approximately 180° C. and the tools 2a, 2b are maintained at an elevated temperature to keep the component at a temperature of 180° C.+/−5° C. for approximately 4 hours while the composite material cures to form a consolidated component. The temperature profile of the component 1 varies during the curing process, for example during a warming period while the temperature of the component is raised towards 180° C. and optionally during a lower temperature dwell period. The duration of the curing period and the temperature profile of the component during the curing process are dependent on the materials used and the design of the component, and may, therefore, vary in different embodiments of the invention.

During the curing process the vacuum pump is operated to maintain at least a partial vacuum within the sealed region. At the end of the curing process the matrix material is substantially cured and the plies are consolidated to form a continuous, finished component. The finished component may then be removed from the microwave oven and from the tools 2a, 2b, as illustrated in FIG. 2d, and allowed to cool before any further finishing operations occur.

The moulding surfaces 5a, 5b of the tools exert pressure on the component (via the shields 3a, 3b and the breather layer 8) during the cure process to the full area of both major outer surfaces of the component. By covering the full area of both major outer surfaces of the component, the tools 2a, 2b apply heat and pressure evenly across the whole component, allowing an even temperature distribution through the component during curing and close control of the performance of the finished component.

The shields 3a, 3b shield the upper and lower major faces of the component and thus substantially prevent microwaves 15 from passing through the tools 2a, 2b and into the component 1. The shields 3a, 3b therefore substantially prevent direct heating of the component 1 due to absorption of microwaves 15. The shields 3a,3b also engage each other round the periphery of the component 1 so as to shield the minor side faces of the component and thus fully surround it.

Heating a component by the direct absorption of microwaves 15 typically leads to the presence of "hot spots" and "cold spots", resulting in unpredictable temperature distributions and reduced and unpredictable performance of the component. Preventing the direct heating of the component 1 by microwaves, thereby reducing the unpredictable variations in temperature through the component during the curing process, allows improved and more predictable performance of the finished component.

The heat conducting filler acts to improve heat transfer through the tools 2a, 2b so that heat is transferred more easily from one part of the tools to another. The problem of "hot spots" and "cold spots" within the tools 2a, 2b is therefore reduced because the hotter regions of the tools are able to transfer heat readily to cooler regions of the tools to maintain a less varied temperature distribution within the tools. In this way the temperature of the tools 2a, 2b may be more accurately controlled and temperature variations across the tools minimised, so that the component may be heated more accurately and uniformly to allows improved and more predictable performance of the finished component. The heat conducting filler also improves the transfer of heat from the tools 2a, 2b towards the moulding surfaces 5a, 5b and thence through the shields 3a, 3b into the component 1, thereby reducing the time taken to bring the component to the desired temperature.

The temperature distribution through the tools 2a, 2b is measured by the thermocouples 9 and this data is used by the processing system to control the temperature of the tools during the curing process. Using data generated by the thermocouples 9, the microwave emitting devices 14 are turned on and off as required, providing control of the curing process.

The microwave emitting devices 14 do not need to be operated continuously during the curing process. The tools 2a, 2b maintain their temperature and continue to transfer thermal energy to the component 1 during time periods in which they are not being heated by microwaves 15.

The dimensions of the component 1 may change during the curing process, for example due to shrinkage as the component cures. The movable mounting of the upper tool 2a in relation to the lower tool 2b via the spigots 6 allows the upper tool to move relative to the lower tool during the curing process, for example to allow for shrinkage of the component 1.

The tools 2a, 2b apply pressure to the component 1 through their respective moulding surfaces 5a, 5b by virtue of the weight of the upper tool 2a as well as the vacuum pressure. The upper tool 2a may have a variable thickness which applies weight pressure in the right proportions across the extent of the component 1 as required.

The weight of the upper tool 2a acts to secure it relative to the lower tool 2b and to apply pressure to the component 1, thereby eliminating the need for the component to be cured in a pressurised environment, for example in an autoclave or pressurised oven. It is not, therefore, necessary to install a pressurised curing system so that the set-up cost of the apparatus is reduced. By eliminating the need to pressurise the curing system, energy requirements and running costs are reduced.

Curing the component 1 using a microwave oven reduces the cycle time for the curing operation compared to a cycle time for an autoclave or a conventional oven because it is not necessary to bring the entire oven up to the required curing temperature. Therefore composite parts may be manufactured more quickly.

In an alternative embodiment, the tools and the component may be placed in a pressure vessel and the component 1 may be compressed by the pressure within the pressure vessel acting through the tool. In such an embodiment, the upper and/or lower tool may comprise a material which is sufficiently flexible to allow the tool to deform slightly around the component and apply pressure as required across the extent of the component.

In an alternative embodiment, the component may comprise an "out of autoclave" matrix material which does not require compression during the curing process, and the tools 2a, 2b may not need to apply significant pressure.

In an alternative embodiment, the shields may be integrated into the tools 2a, 2b, for example as reflective layers provided on the moulding surfaces 5a, 5b. The shields may, for example, be coatings applied to the moulding surfaces or inner sub-layers of the tools.

The microwave sensitive tools 2a, 2b, and shields 3a, 3b are provided on opposite sides of the component 1 to ensure even heating of the component during the curing process. However, in an alternative embodiment a microwave sensitive tool and shield may only be provided on one side of the component, the other side being compressed by a tool which is not made of microwave sensitive material.

Although the invention has been described above with reference to one or more preferred embodiments, it will be appreciated that various changes or modifications may be made without departing from the scope of the invention as defined in the appended claims.

The invention claimed is:

1. A method of curing a composite material comprising:
   heating a tool by applying microwaves to the tool;
   shielding from the microwaves a composite material in an un-cured or partially cured state, wherein the shielding includes positioning a microwave reflecting shield between the microwaves and the composite material while the microwaves are heating the tool;
   curing the composite material in a sealed chamber including a hole, wherein gases flow from the sealed chamber through the hole and out of the chamber during the curing, and
   transferring heat generated by the microwaves from the tool through the shield to the composite material while the composite material is being cured.

2. The method according to claim 1, wherein the hole extends through the tool.

3. The method according to claim 1, further comprising drawing air out of the sealed chamber through the hole into a vacuum duct.

4. The method according to claim 1, wherein a breather layer over the composite material provides a passage for the gas to flow from the composite material through the hole and out of the sealed chamber.

5. The method according to claim 4, wherein the breather layer absorbs excess liquid matrix material from the composite material during curing.

6. The method according to claim 3, further comprising a breather layer over the composite material, wherein the breather layer provides a passage for the gas to flow through the hole and out of the chamber, and the breather layer covers the hole thereby preventing liquid matrix material from composite material being drawn into the hole.

7. The method according to claim 1, wherein a temperature of the composite material is raised to a desired curing temperature, and maintained within 5° C. of the desired curing temperature while the curing occurs.

8. The method according to claim 1, wherein the shielding substantially surrounds the composite material.

9. The method according to claim 1, wherein the shielding is arranged such that substantially no microwaves are incident upon the composite material while the tool is being heated.

10. The method according to claim 1, wherein the shielding is disposed between the tool and the composite material.

11. The method according to claim 1, wherein the tool comprises a molding surface, and the method further comprises applying molding pressure to the composite material with the mold surface through the shield to mold the composite material while the tool is heated.

12. The method according to claim 11, wherein the mold surface applies a pressure of at least 0.1 MPa to the composite material through the shielding.

13. The method according to claim 1, wherein a temperature of the composite material is raised to at least 100° C. during the heating.

* * * * *